United States Patent Office

3,787,375
Patented Jan. 22, 1974

3,787,375
HIGH MOLECULAR WEIGHT, HIGH MELTING, LINEAR POLYAMIDES PREPARED FROM TRANS,TRANS-4,4'-DIAMINOBICYCLOHEXYL
Ronald Gene Blecke, Shawnee Mission, Kans., assignor to Gulf Research & Development Company, Pittsburgh, Pa.
No Drawing. Filed Oct. 13, 1971, Ser. No. 189,035
Int. Cl. C08g 20/20
U.S. Cl. 260—78 R                           5 Claims

ABSTRACT OF THE DISCLOSURE

Fiber and film forming linear polyamides having unusually high melting points are prepared by effecting polymerization of the salt formed between an equimolar mixture of trans,trans-4,4'-diaminobicyclohexyl and an alpha, omega aliphatic dicarboxylic acid containing up to 12 carbon atoms. The polyamide prepared from trans, trans-4,4'-diaminobicyclohexyl and dodecanedioic acid has a softening point of 360 to 380° C.

BACKGROUND OF THE INVENTION

Multitudes of high molecular weight linear polyamides prepared from alpha, omega diamines and alpha, omega dibasic acids are known in the art. Such polymers are characterized in being thermoplastic materials which can be readily fabricated into films and fibers having desirable physical properties. It is recognized that the utility of such polyamides can be improved by increasing their melting points and the art is constantly seeking new species of polyamides having still higher melting points.

One of the techniques reported in the literature for preparing polyamides having a high melting point is to prepare polyamides from a dicarboxylic acid and a diamine containing cyclohexyl groups in its structure. B. D. Kalmykova, et al.—Vysokomol soyed, A9: No. 12, 2539–2542, 1967 (reprinted in Polymer Sei, U.S.S.R., 9 (12), 2872 (1967))—report the preparation of two polyamides obtained by the polymerization of azelaic acid and sebacic acid with a diamine characterized as being an isomer mixture of 4,4'-diaminobicyclohexanes. These polyamides, while reported as having high melting points, were stated to be of little interest in that they had relatively low molecular weights and were not thermally stable, and in that films prepared herefrom were brittle. These polyamides were prepared at a maximum polymerization temperature of 300° C.

SUMMARY OF INVENTION

A new class of high molecular weight linear polyamides having very high melting points are prepared by polymerization of the salt formed between an equimolar mixture of trans,trans-4,4'-diaminobicyclohexyl and an alpha, omega aliphatic dicarboxylic acid containing up to 12 carbon atoms. The polymerization is carried out in the solid state with the finishing temperature being in the range of about 320–350° C. The trans,trans-4,4'-diaminobicyclohexyl included in the polymerizable salt has a purity of at least 90 mol percent. The dicarboxylic acids included in the polymerizable salt are those containing from 5 to 12 carbon atoms.

DETAILED DESCRIPTION OF INVENTION

The diamine included in the polymerizable salt employed to prepare polyamides of this invention is trans, trans-4,4'-diaminobicyclohexyl (sometimes subsequently identified as t,t-DACH). The t,t-DACH is purified to the state at which it has a purity of at least 90 mol percent. At this state of purity, t,t-DACH has a melting point of 140–142° C.

t,t-DACH of the requisite purity can be obtained by recrystallization of t,t-DACH from a crude reaction mixture containing t,t-DACH in admixture with other diaminobicyclohexyls, including the 4,4'-DACH stereoisomers, i.e., the cis,cis and the cis,trans-4,4'-diaminobicyclohexyls, and the stereoisomers of 2,4'-diaminobicyclohexyls. The crude mixture of the diaminobicyclohexyls is dissolved in hot isopropanol and on cooling the crystalline material is enriched in the desired t,t-DACH. Successive recrystallizations are run until the product has a purity of at least 90 mol percent t,t-DACH. The melting point is a sufficiently good criterion of purity and material having a melting point of at least 140–142° C. can be employed in the practice of the invention.

The crude reaction mixtures of diaminobicyclohexyls from which the desired t,t-DACH is recovered can be prepared by the methods described in Canadian Pat. 837,126. Biphenyl can be dinitrated by conventional techniques to provide a reaction mixture containing about 12–13% of the 2,2' isomer, 52–54% of the 2,4' isomer and 32–33% of the 4,4' isomer. The dinitrobiphenyls are easily reduced by catalytic hydrogenation (5% Pd catalyst on charcoal in isopropanol at 20 p.s.i.) to give a corresponding mixture of the diamino compounds. The aromatic diamines can be hydrogenated under more stringent conditions to saturate the aromatic rings. This hydrogenation is run in an isopropanol solution saturated with anhydrous ammonia employing a ruthenium catalyst (5% supported on alumina). A hydrogen pressure of about 2,000 p.s.i. is normally employed at a temperature of about 135° C. The bulk of the 2,2' isomers are lost in this hydrogenation step, presumedly through deamination reactions.

The alpha, omega aliphatic dibasic acids included in the polymerizable salt employed to prepare the polyamides of the invention are the dibasic acids containing up to 12 carbon atoms. The prefererd dibasic acids are those containing from 5 to 12 carbon atoms in their structure, such as adipic acid, sebacic acid and dodecanedioic acid. Such acids are known compounds, many of which are commercially available.

The novel polyamides are prepared by polymerization of the salt formed between the t,t-DACH and the desired dibasic acid. The t,t-DACH and dibasic acid are mixed in a suitable common solvent, such as hot dimethylformamide, and upon standing the desired salt precipitates as a crystalline solid. The salt is preferably washed with an organic liquid such as benzene which dissolves the diamine and the dibasic acid, but which has little or no solvent power for the crystalline salt.

To carry out the polymerization, the salt is placed in an oxygen-free reaction vessel and an inert gas such as argon is continuously fed through the reaction zone to exclude oxygen and to remove water formed during the polymerization. The polymerization is carried out over an extended period of time, utilizing higher temperatures than are conventionally employed to prepare nylon-6,6. The polymerization is initiated at a temperature of the order of at least about 280° C., and is increased to a maximum temperature of the order of 320 to 350° C. before terminating the polymerization. A polymerization period of the order of 12 to 24 hours at the 320–350° C. temperature is ordinarily required to complete the polymerization and obtain a polyamide having desired molecular weights and physical properties.

The physical characteristics of the novel polyamides of this invention are generally similar to known polyamides, except for their substantially higher melting points and somewhat lower solubility in the known solvents for polyamides. The polyamides of the invention have melting points of at least 310° C., as determined between glass discs on a Fisher-Johns melting point apparatus. In their solubility characteristics, the novel polyamides of this invention most closely approximate polyamdies prepared from aliphatic dibasic acids and bis-4-aminocyclohexylmethane.

The following examples are set forth to illustrate more clearly the principle and practice of this invention to those skilled in the art.

EXAMPLE I

Part A

A solution of t,t,-DACH in dimethylformamide was prepared by adding 21.6 grams of t,t-DACH to 300 ml. of dimethylformamide and heating the resulting mixture to about 80° C. In a like manner a solution of sebacic acid in dimethylformamide was prepared by adding 8.8 grams of sebacic acid to 300 ml. of dimethylformamide and heating the mixture to about 80° C. The two solutions were poured together in a reaction vessel where they were stirred vigorously. A copious precipitate formed nearly immediately, the precipitate being the salt formed between the amine and the acid.

The mixture was allowed to stand for 16 hours to insure completion of salt formation. The salt was separated by filtration, washed with benzene and refiltered. The salt was twice more washed and filtered in this manner, the final filtrate containing essentially no dimethylformamide. The salt was dried for 16 hours in a vacuum oven at 60° C. The dried salt was a fine white powder which melted over a range of 280 to 287° C. with decomposition as determined between glass discs on a Fisher-Johns melting point apparatus.

Part B

Five (5) grams of the salt prepared in Part A were placed in a 25 x 200 mm. filtering tube fitted with a gas inlet and a gas outlet through which argon was circulated as a purge material. The apparatus was placed in a heating bath and the temperature was raised to 320° C. over a two-hour period and then held at 320° C. for 16 hours. There was no evidence of any melting that took place throughout the polymerization cycle, the polymerization seemingly occurring in the solid state.

A yield of 4.4 grams of a fluffy white powder was obtained, which exhibited a melting point greater than 400° C. as determined between glass discs on a Fisher-Johns melting point apparatus. The polymer had a high molecular weight, as evidenced by the fact that it had an inherent viscosity of 1.78 dl./g., determined as a 0.5% solution in concentrated sulfuric acid at 25° C.

An aliquot of the polymer was dissolved in hexafluoroisopropanol and a film was cast therefrom. The film obtained was translucent in appearance and was very tough.

EXAMPLES II–VI

In a manner analogous to that described in Example I, five additional polyamides were prepared from t,t-DACH and, respectively, the C5, C6, C8, C9 and C12 alpha, omega aliphatic dibasic acids. The melting points of the polymers (determined between glass discs on the Fisher-Johns melting point apparatus) and their inherent viscosities (determined as a 0.5% solution of concentrated sulfuric acid at 25° C.) are shown in Table I.

TABLE I

| Example: | Carbon atoms in dibasic acid | Melting point, ° C. | Inherent viscosity |
|---|---|---|---|
| II | 5 | ~350 | 0.66 |
| III | 6 | ~340–400d | 1.35 |
| IV | 8 | ~320–340d | 1.02 |
| V | 9 | ~320–400 | 1.17 |
| VI | 12 | 360–380d | 1.10 |

The preferred polyamides of the invention are those prepared from the salt formed between only t,t-DACH and the aliphatic dibasic acid, which components should be employed in substantially an equimolar mixture. The inclusion of other diamines in the polymerizable salt will inevitably result in lowering the melting point of the polyamide. As noted earlier herein, the t,t-DACH must have a purity of at least 90 mol percent. In a like manner, the inclusion of other dicarboxylic acids in the polymerizable salt tends to lower the melting point of the polyamide, although the effect is not usually as pronounced as is the case of including a second diamine in the polymerizable salt.

The method of polymerization described earlier herein must be followed to obtain polyamides having desirable physical properties. While polyamides can be obtained by effecting the polymerization at somewhat lower temperatures of the order of 300° F., the polyamides thus obtained have relatively poor physical properties, possibly by reason of undesirably low molecular weights.

By reason of their unusually high melting points, which are sometimes accompanied by partial decomposition, the fabrication of articles such as films and filaments by melt fabrication techniques is more difficult than is the case with lower melting polyamides. Films and fibers are most conveniently prepared by dissolving the polyamide in a suitable solvent and preparing films and filaments from such solutions. Solvents that can be employed include hexafluoroisopropanol and lithium chloride-dimethylformamide mixtures.

By reason of their high melting points and lack of solubility in many common solvents, the polyamides of the invention have particular utility for use as fibers and films where good high temperature resistance and/or solvent resistance is required.

The above descriptions and particularly the examples are set forth for purposes of illustration only. Many variations and modifications thereof will be apparent to those skilled in the art and can be made without departing from the spirit and scope of the invention herein described.

What is claimed is:

1. A process for preparing a high molecular weight film or fiber forming polyamide having a melting point of at least about 310° C. as determined between glass discs on a Fisher-Johns melting point apparatus, which consists essentially of heating the salt formed between an equimolar mixture of trans,trans-4,4'-diaminobicyclohexyl and an alpha, omega aliphatic dicarboxylic acid containing up to 12 carbon atoms to a temperature in the range of from about 320° C. to about 350° C. for a period of at least about 12 hours, the trans,trans-4,4'-diaminobicyclohexyl included in the salt having a purity of at least 90 mol percent.

2. The process of claim 1 where the alpha, omega aliphatic dicarboxylic acid moiety of the salt contains 5 to 12 carbon atoms.

3. The polyamide prepared by the process of claim 2.

4. A filament of the polymer of claim 3.

5. A film of the polymer of claim 3.

References Cited

UNITED STATES PATENTS

| 2,512,606 | 6/1950 | Bolton et al. | 260—78 R |
| 2,625,536 | 1/1953 | Kirby | 260—78 R |

FOREIGN PATENTS

| 2,045,770 | 4/1971 | Germany. | |

HAROLD D. ANDERSON, Primary Examiner

U.S. Cl. X.R.

260—30.8 R, 32.6 N, 33.4 R